United States Patent [19]

Barsk et al.

[11] Patent Number: 5,044,489

[45] Date of Patent: Sep. 3, 1991

[54] FEED SCREW

[75] Inventors: Jaakko Barsk, Tampere; Pekka Havola, Parainen; Olli Kekäläinen; Rantanen, both of Toijala, all of Finland

[73] Assignee: Oy Partek Ab, Toijala, Finland

[21] Appl. No.: 579,282

[22] Filed: Sep. 6, 1990

Related U.S. Application Data

[63] Continuation of Ser. No. 342,791, Apr. 25, 1989, abandoned.

[30] Foreign Application Priority Data

Apr. 27, 1988 [FI] Finland ................................ 881980

[51] Int. Cl.[5] ............................................ B65G 33/32

[52] U.S. Cl. .................................. 198/666; 198/677; 366/88; 366/323; 100/145; 425/208

[58] Field of Search ............... 198/661, 666, 676, 677; 366/79, 88, 89, 323; 100/145; 222/412, 413; 425/64, 208, 209

[56] References Cited

U.S. PATENT DOCUMENTS

| | | | |
|---|---|---|---|
| 1,090,956 | 3/1914 | Zinteck | 198/666 |
| 3,666,386 | 5/1972 | McElroy et al. | |
| 3,877,860 | 4/1975 | Putti | |
| 3,998,318 | 12/1976 | McAlarney | 425/208 |
| 4,022,556 | 5/1977 | Goetjen | 425/209 |
| 4,046,848 | 9/1977 | Putti | |
| 4,073,160 | 2/1978 | Perret | |
| 4,167,339 | 9/1979 | Anders | 366/79 |
| 4,344,718 | 8/1982 | Taylor | |
| 4,746,220 | 5/1988 | Sukai et al. | 425/209 |
| 4,852,719 | 8/1989 | Lapeyre | 198/666 |

FOREIGN PATENT DOCUMENTS

| | | |
|---|---|---|
| 0082899 | 7/1983 | European Pat. Off. |
| 836916 | 4/1952 | Fed. Rep. of Germany |
| 1258775 | 1/1968 | Fed. Rep. of Germany |
| 2059760 | 6/1971 | Fed. Rep. of Germany |
| 2636382 | 2/1977 | Fed. Rep. of Germany |
| 447358 | 11/1986 | Sweden |
| 286036 | 10/1952 | Switzerland |

*Primary Examiner*—Joseph E. Valenza
*Attorney, Agent, or Firm*—Burns, Doane, Swecker & Mathis

[57] ABSTRACT

Feed screw for feeding a mix, said screw consisting of a core part (1), which becomes thicker towards its trailing end, and of a screw spiral (2) that revolves around said core part. The feed screw is provided with a detachable tip portion (3) at its thicker end. The detachable tip portion (3) is a sleeve-shaped piece, which is supported on an inner part (4) that constitutes a projection on the frame part of the feed screw. The frame part includes at least one front face (6) which, when the machine runs and when the screw revolves, pushes ahead of itself a counter-face (7) provided in the tip portion (3) and transmits the torque to the tip portion.

9 Claims, 3 Drawing Sheets

FEED SCREW

Figure 1:
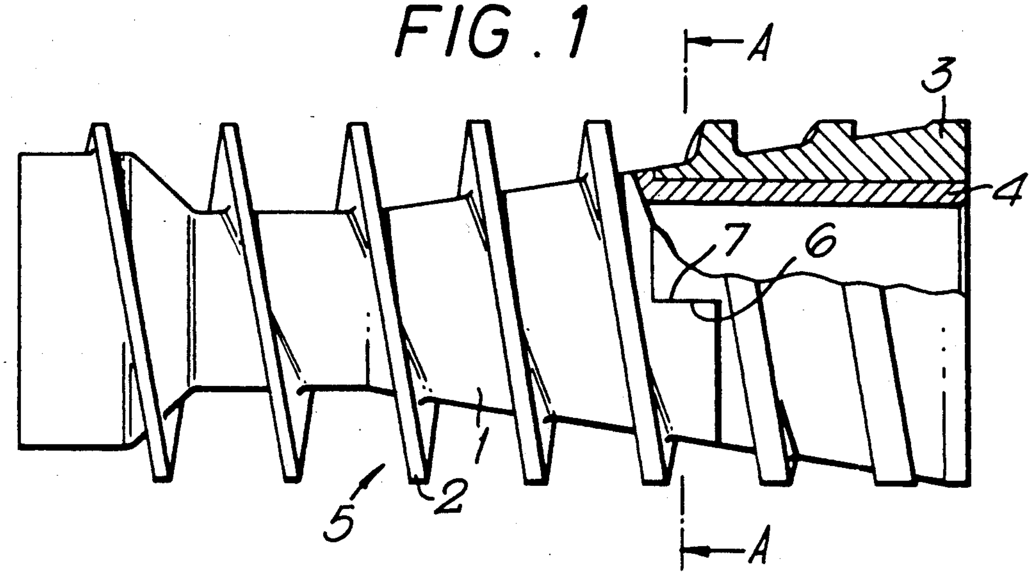

This application is a continuation of application Ser. No. 342,791, filed Apr. 25, 1989 now abandoned.

The present invention concerns a feed screw for feeding a mix, said screw consisting of a core part, which becomes thicker towards its trailing end, and of a screw spiral that revolves around said core part, whereby the feed screw is provided with a detachable tip portion at its thicker end.

When hollow slabs are cast out of concrete by means of the slide-casting method, in the casting machine a revolving feed screw placed facing the cavity that is being formed is used for feeding the mix. Inside the formwork, the device comprises several feed screws placed side by side, said screws being supported at one of their ends. Owing to this, high bending forces are directed at the screws. Ordinarily the core part of a feed screw becomes thicker towards the trailing end of the screw, whereby, at the same time, compacting of the mix is achieved. Such slide-casting machines are described, e.g., in the German Published Pat. Appl. 2,059,760. In the same publication, a feed screw is also described to whose trailing end a detachable extension may be attached by means of bolts if necessary. The detachable tip described in said publication is used when the diameter of the cavities to be formed is larger than usual.

It has been a problem in the casting of prefabricated concrete units that the concrete mix, which contains the aggregate, abrades the thicker tip portion of the feed screw more rapidly than the rest of the screw, as a result of the increasing pressure when the mix is compacted towards the trailing end of the screw. Owing to a worn-out tip portion, it has been necessary to replace the whole screw, which has involved considerable costs.

In the Swedish Published Pat. Appl. 447,358 a feed screw is described which is provided with a detachable mantle portion consisting of two or more segments, in which case a worn-out mantle portion can be replaced readily. In the surface of the trailing end of the mantle, it is possible to use hard-metal granules so as to obtain an improved resistance to abrasion. However, in this solution as well, it is necessary to replace the whole mantle portion of the screw at one time.

The feed screw in accordance with the present invention is characterized in that the detachable tip portion is a sleeve-shaped piece, which is supported on an inner part that constitutes a projection on the frame part of the feed screw, and that the frame part includes at least one front face which, when the machine runs and when the screw revolves, pushes ahead of itself a counter-face provided in the detachable tip and transmits the torque to the tip. Thus, according to the invention, the joint portion between the frame part and the detachable tip portion is constructed so that no separate additional fixing members or joint parts are required, but the counter-faces and support faces provided on the frame part and in the tip portion of the screw transfer the torque and the forces of the screw. The detachable tip portion of the screw in accordance with the invention is a sleeve-shaped piece which is, at both of its ends, supported on a shaft that constitutes a projection on the frame part, whereby the radial forces applied to the tip portion in a situation of operation of the screw are transmitted directly to the frame part, and no bending strains arise in the joint.

As one application in the feed screw in accordance with the invention, at the joint between the tip portion and the frame part of the screw, at the front face of the joint, there is one or several counter-face(s) parallel to the axis of the screw or at a certain angle relative the axis and parallel to the radius of the screw, which said counter-face transmits the torque that rotates the screw from the frame part to the tip portion. In such a case, the tip portion can be mounted and removed easily merely by means of an axial thrust movement. In a situation of operation, the reaction force produced by the pitch of the screw spiral causes the holding together of the joint. The compacting mandrel that follows the screw also prevents shifting of the detachable tip of the screw in the axial direction out of its place in a situation in which the machine is not in operation.

The joint technique in accordance with the present invention is particularly important when ceramic or very hard metallic materials are used wherein, owing to the brittleness or hardness of the material, it is impossible to use, e.g., a bolt fastening or a joint accomplished by means of threading.

The shaft that constitutes a projection of the frame part of the screw may also have a cross-sectional shape different from circular, e.g. angular, in which case the torque from the frame part to the tip portion is transmitted through this shaft. In such a case, the front face of the frame part consists of the flank of each edge that moves ahead when the screw revolves.

The material of the tip portion may be, e.g., steel of special hardness or some other metal or metal compound or a ceramic material which endures abrasion well. In a corresponding way, the frame part and the mantle of the initial end of the screw may be made of a softer but tougher material which is again highly resistant to torsion and bending. The screw may, viz., be subjected to even very high bending forces when stones contained in the mix enter between the screws.

Figure 2:
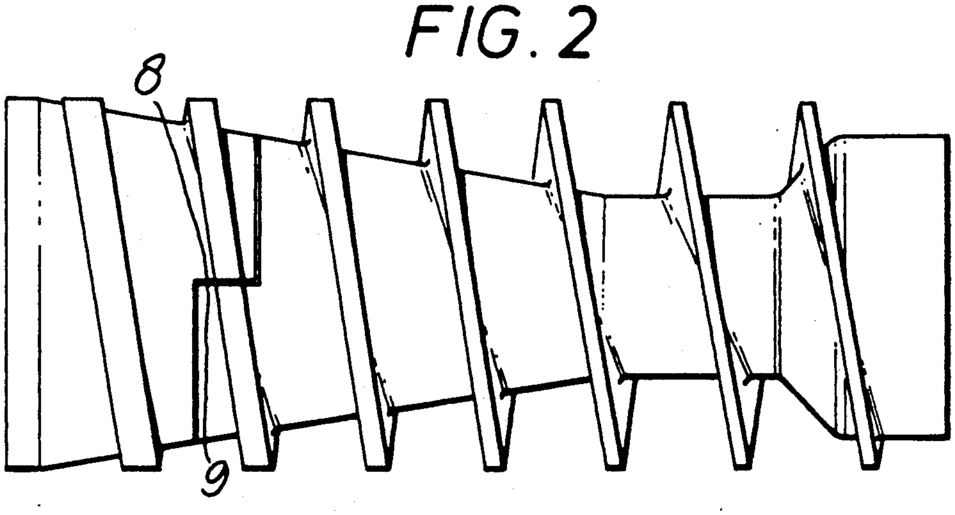
Figure 8:
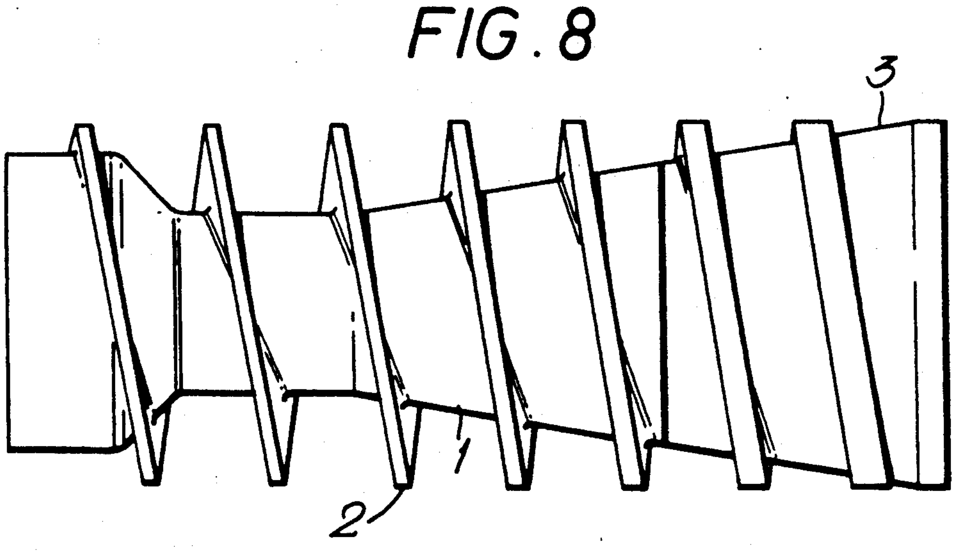
Figure 3:
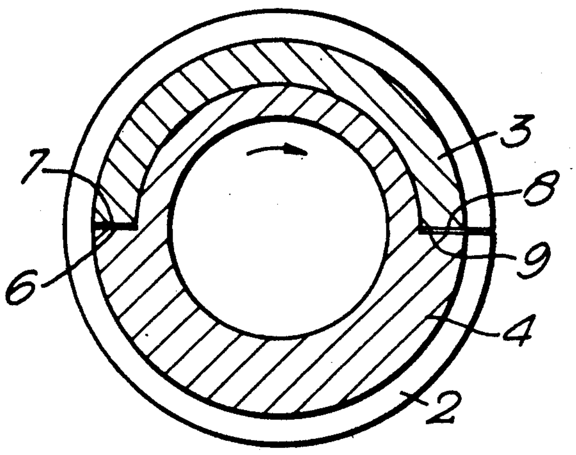
Figure 4:
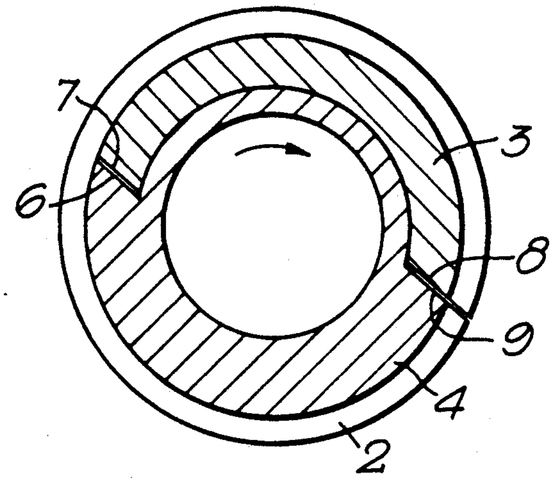
Figure 9:
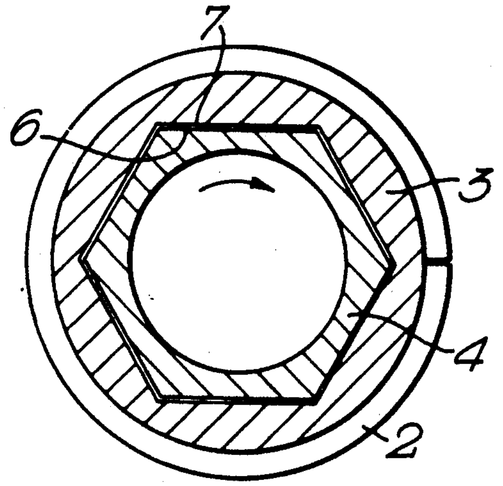
Figure 5:
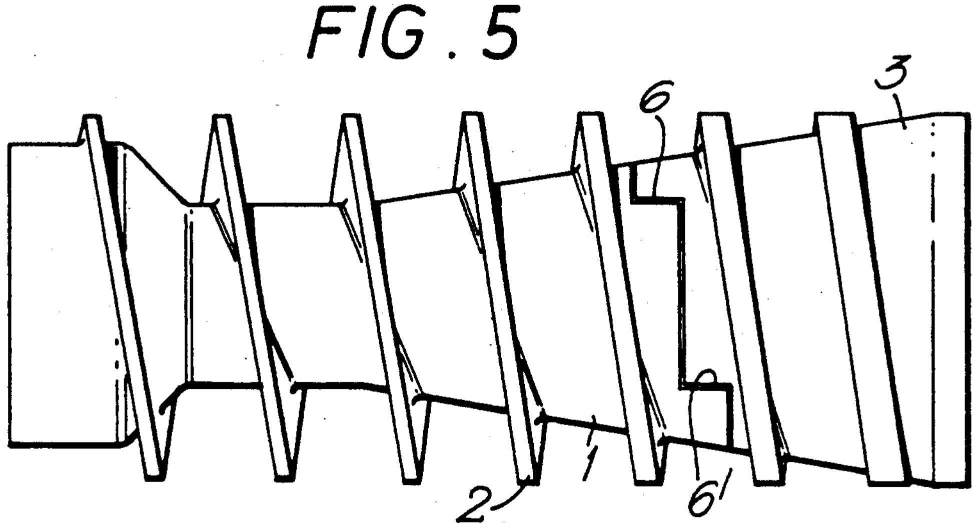
Figure 6:
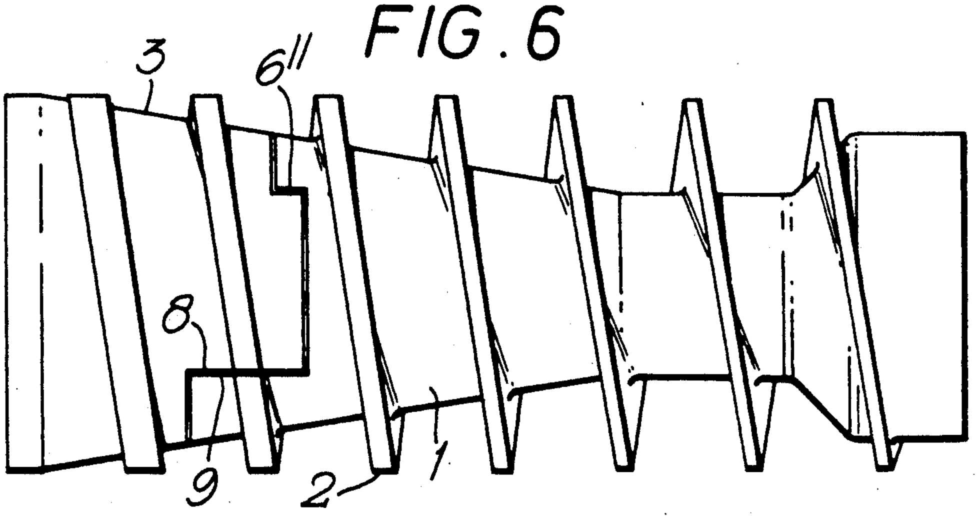
Figure 7:
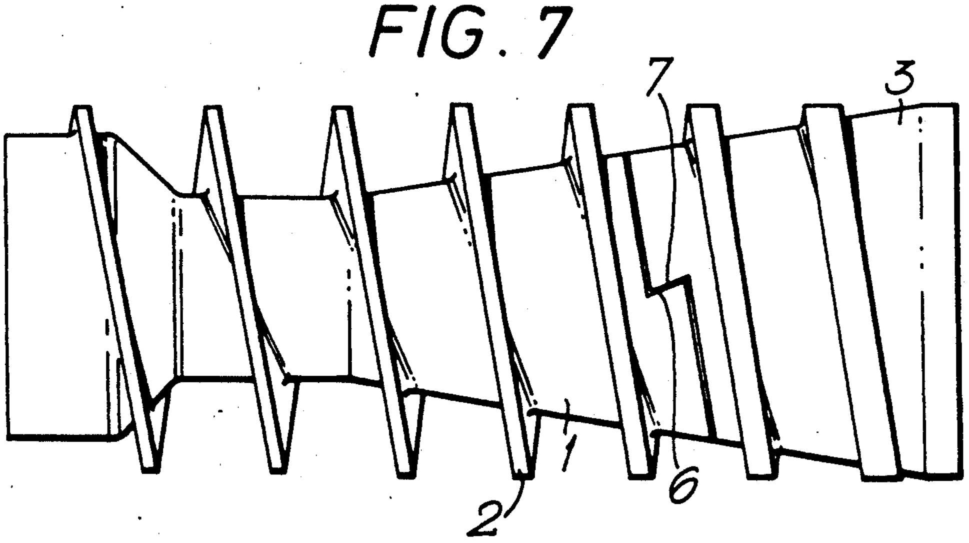

The invention and its details will be described in more detail in the following with reference to the accompanying drawings, wherein FIG. 1 is a side view of a feed screw in accordance with the invention partly in section, FIG. 2 shows the feed screw of FIG. 1 seen from the opposite side, FIG. 3 shows a section A—A in FIG. 1, FIG. 4 shows an alternative section A—A in FIG. 1, FIGS. 5 and 6 show an alternative embodiment of a feed screw seen from two sides, FIG. 7 is a side view of a further embodiment, FIG. 8 shows another alternative, and FIG. 9 is a cross-sectional view of FIG. 8.

(In FIGS. 2 and 6 the screw spiral is not illustrated as placed exactly in the correct location; they are just illustrations of principle.)

The feed screw consists of a conical core part 1 and of a screw spiral 2 revolving around it. The direction of rotation of the screw is, seen from the right in FIG. 1, i.e. from the trailing end, clockwise. The core part becomes thicker towards the trailing end of the screw.

The mantle portion 3 of the trailing end of the screw is shaped as a separate sleeve-like detachable tip. The shaft part 4 of the trailing end is made of one piece with the initial end 5 of the screw or, alternatively, it is a separate sleeve shaft, which is mounted in a recess, e.g. a bore, provided in the frame part. The screw spiral 2 revolves as continuous both around the initial end 5 and around the tip portion 3. In the embodiment shown in FIGS. 1 and 2, there is a step-like point at the joint between the detachable tip 3 and the frame part 5, at which said step the faces 6 and 7 parallel to the axis of the screw have been formed, the front face 6 on the frame part and the counter-face 7 in the detachable tip (FIG. 1). On the circumference of the screw, at the opposite side, there may be a similar step formation 8, 9 back (FIG. 2), or the foremost level and the rearmost level of the step may join each other, e.g., as screw-shaped.

When the frame part 5 of the screw is rotated by means of suitable drive members, the front face 6 transmits the torque to the tip portion and makes it revolve along with the frame part.

The detachable tip is very easily exchangeable, because it can be simply pulled axially off the shaft part 4. By choosing the material hardnesses appropriately, it is achieved that both the frame part and the detachable tip have an equally long service life. However, if necessary, either one of them can be replaced readily.

In the cross-sectional view of a preferred embodiment shown in FIG. 3, the front face 6 and the counter-face 7 are parallel to the radius of the screw. The front face 6 and the counter-face 7 may also form an angle with the radius, e.g., so that, when the screw revolves, the edge of the front face 6 that is placed further apart from the shaft of the screw moves ahead (FIG. 4).

If necessary, the circumference of the frame part at the joint may also be provided with a higher number of front faces 6, in which case the detachable tip has a correspondingly higher number of counter-faces 7. In FIGS. 5 and 6, an advantageous solution is shown wherein the torque is distributed among three front faces, which are placed on the circumference of the mantle at different locations. In this way the strain caused by the torque is distributed over a larger area. In this embodiment, front faces at the screw spiral 2 projecting from the core part 1 are also avoided. The three subsequent parts 6, 6' and 6'' of the front face are placed on the mantle face of the core part at different locations of the circumference. The axial shifting rearwards is placed at the joint faces 8,9 so that the projecting spiral part 2 has to be cut-off only once. Between the joint faces 8,9 there is no strain caused by the torque, but at this interface a little gap is formed during the movement of rotation.

When the joint face cuts off the spiral part 2, it is preferable that the cut face should not form an angle excessively far from a right angle with the face of the spiral face that moves ahead and with the face of the trailing side, in order that the interface should not make the spiral weaker. Advantageously, the interface forms an angle with the foremost and the rearmost faces of the spiral that differs from a right angle at the maximum by 45°, most appropriately at the maximum by 30°.

In the embodiments described above, the front faces are parallel to the axis of the screw. The front face may also be at a certain angle relative the direction of the axis, i.e. in the way illustrated in FIG. 7. In FIG. 7, the front face forms such an angle with the direction of the axis that the end of the front face that is placed at the side of the trailing end moves ahead when the screw revolves.

FIGS. 8 and 9 illustrate a further embodiment of the invention. The cross-sectional shape of the inner part 4 differs from a circle, being, e.g., hexagonal. The inner face of the sleeve-like tip portion 3 is shaped accordingly, and the parts are fitted one inside the other.

Besides being suitable for the casting of concrete, the feed screw in accordance with the invention is equally well suitable for any other use whatsoever where the mix causes intensive compression and abrasion.

What is claimed is:

1. A feed screw for feeding a mix for slide casting products out of concrete that include one or more cavities, said screw comprising:
   a core part which becomes thicker towards its trailing end,
   a screw spiral that revolves continuously around said core part,
   a detachable tip portion provided at the thicker end of the core part,
   said detachable tip portion being sleeve-shaped,
   an inner part that constitutes a projection on the core part of the feed screw,
   said tip portion being detachably supported by the inner part of the core part,
   said tip portion including a counter-face,
   the core part including at least one front face which, when the screw revolves, pushes ahead of itself the counter-face provided in the tip portion and transmits a torque to the tip portion, and
   said front face in the core part extending to the outer face of the screw.

2. Feed screw as claimed in claim 1, wherein a plane containing the front face in the core is parallel to the axis of the screw.

3. Feed screw as claimed in claim 1, wherein a plane containing the front face in the core part is parallel to the radius of the screw.

4. Feed screw as claimed in claim 1, wherein the core part includes two or more front faces at different locations on the circumference of the screw.

5. Feed screw as claimed in claim 4, wherein the front faces in the core part are placed at different locations in the axial direction.

6. Feed screw as claimed in claim 1, wherein at the screw spiral projecting from the core part, the border face between the core part and the tip portion forms an angle with the front face and the trailing face of the spiral projecting from the core part of the screw which said angle differs from a right angle at the maximum by 45°, most appropriately path the maximum by 30°.

7. Feed screw as claimed in claim 3, wherein the core part includes two or more front faces at different locations on the circumference of the screw.

8. Feed screw as claimed in claim 7, wherein the front faces in the core part are placed at different locations in the axial direction.

9. Feed screw as claimed in claim 2, wherein at the screw spiral projecting from the core part, the border face (6,7 or between the core part and the tip portion forms an angle with the front face and the trailing face of the spiral projecting form the core part of the screw which said angle differs from a right angle at the maximum by 45°, most appropriately path the maximum by 30°.

* * * * *

UNITED STATES PATENT AND TRADEMARK OFFICE

CERTIFICATE OF CORRECTION

PATENT NO. : 5,044,489

DATED : September 3, 1991

INVENTOR(S) : Jaakko Barsk et al.

It is certified that error appears in the above-identified patent and that said Letters Patent is hereby corrected as shown below:

Title Page:
Modify item [75] at Page 1 to read:

[75] Inventors: Jaakko Barsk, Tampere; Pekka Havola, Parainen; Olli Kekäläinen; Heikki Rantanen, both of Toijala, all of Finland

Signed and Sealed this

Third Day of November, 1992

*Attest:*

DOUGLAS B. COMER

*Attesting Officer*

*Acting Commissioner of Patents and Trademarks*